US012361178B2

(12) United States Patent
R et al.

(10) Patent No.: US 12,361,178 B2
(45) Date of Patent: Jul. 15, 2025

(54) SECURE KEYBOARD WITH AUTO KEY LOCK USING MOBILE DEVICE SIGNAL RANGE TRACKING

(71) Applicant: Dell Products L.P., Round Rock, TX (US)

(72) Inventors: Malathi R, Madurai (IN); Peng Lip Goh, Singapore (SG); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 693 days.

(21) Appl. No.: 17/680,692

(22) Filed: Feb. 25, 2022

(65) Prior Publication Data
US 2023/0274038 A1   Aug. 31, 2023

(51) Int. Cl.
*G06F 21/83* (2013.01)
*G06F 3/023* (2006.01)
*H04W 4/02* (2018.01)

(52) U.S. Cl.
CPC ............ *G06F 21/83* (2013.01); *G06F 3/0231* (2013.01); *H04W 4/023* (2013.01)

(58) Field of Classification Search
CPC ........ G06F 21/83; G06F 3/0231; G06F 21/35; H04W 4/023; H04W 4/02
See application file for complete search history.

(56) References Cited

U.S. PATENT DOCUMENTS

| 5,097,506 | A  | * | 3/1992  | Kaiser, Jr. | ............... | G06F 21/31 |
|           |    |   |         |            |                 | 726/19     |
| 5,465,083 | A  | * | 11/1995 | Okamoto    | ................ | G06F 21/83 |
|           |    |   |         |            |                 | 340/5.74   |
| 9,443,071 | B2 | * | 9/2016  | Horton     | .................. | H04L 9/3234 |

(Continued)

OTHER PUBLICATIONS

Security Stack Exchange, "Keyboards with Build in SmartCard Reader. PIN/Password to Unlock Not via Computer," downloaded from https://security.stackexchange.com/questions/33264/keyboards-with-built-in-smartcard-reader-pin-password-to-unlock-not-via-compute on Jun. 3, 2022 (admitted published prior to filing date of Feb. 25, 2022), 3 pages.

(Continued)

*Primary Examiner* — Baotran N To
(74) *Attorney, Agent, or Firm* — Zagorin Cave LLP

(57) ABSTRACT

A keyboard of an information handling system includes keyboard (RF) transmitter/receiver that provides range information for a mobile device paired to the keyboard RF transmitter/receiver. A keyboard controller is coupled to the keyboard RF transmitter/receiver and is responsive to the range information indicating the mobile device is out of range to disable key input data of the keyboard. After the key input data is disabled, the keyboard controller enables the key input data responsive to the range information indicating the mobile device has come back into range. The keyboard RF transmitter/receiver communicates with a host RF transmitter/receiver over a first RF channel and communicates with the mobile device over a second RF channel. The (Continued)

keyboard controller enables the key input data responsive to a successful override of the keyboard input data being disabled. The override is a predetermined key sequence and/or a valid finger print.

17 Claims, 7 Drawing Sheets

(56) References Cited

U.S. PATENT DOCUMENTS

| | | | | |
|---|---|---|---|---|
| 2003/0080879 | A1* | 5/2003 | Lo | G06F 3/0231 |
| | | | | 341/26 |
| 2011/0314539 | A1* | 12/2011 | Horton | H04W 12/30 |
| | | | | 726/20 |
| 2014/0137235 | A1* | 5/2014 | Horton | H04L 9/3231 |
| | | | | 726/20 |
| 2024/0310925 | A1* | 9/2024 | Autio | G06F 3/0227 |

OTHER PUBLICATIONS

Pavlovic, D., "What Is Windows Hello? Microsoft's Biometric Authentication Feature," downloaded from https://www.hp.com/us-en/shop/tech-takes/what-is-windows-hello-biometric-authentification on Jun. 3, 2022, (admitted published prior to filing filing date of Feb. 25, 2022), 11 pages.

Microsoft, "Lock Your Windows PC Automatically When You Step Away From It," downloaded from https://support.microsoft.com/en-us/topic/d0a5f536-74ac-0859-820a-4140dac9fcaf, on Jun. 3, 2022 (admitted published prior to filing date of Feb. 25, 2022), 2 pages.

* cited by examiner

SECURE KEYBOARD WITH AUTO KEY LOCK USING MOBILE DEVICE SIGNAL RANGE TRACKING

BACKGROUND

Field of the Invention

This invention relates to information handling systems, and more specifically to enhanced security using keyboard locking.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a user walks away from certain types of information handling systems leaving the keyboard unattended, the keyboard continues to allow anyone to key input whether the computer system is screen locked or unlocked. Reducing security risks from unattended keyboards would be desirable.

SUMMARY OF EMBODIMENTS OF THE INVENTION

Accordingly, in an embodiment an information handling system includes a keyboard with a keyboard controller. A first radio frequency (RF) transmitter/receiver determines range information for a mobile device paired to the RF transmitter/receiver and provides the range information to the keyboard controller. The keyboard controller disables key input data for the keyboard responsive to the range information indicating that the mobile device is out of range.

In another embodiment a method for an information handling system includes determining if a mobile device paired with the information handling system is out of range. Key input data for a keyboard of the information handling system is disabled responsive to the mobile device being out of range.

In another embodiment a keyboard of an information handling system includes a first radio frequency (RF) transmitter/receiver to provide range information for a mobile device paired to the first RF transmitter/receiver. A keyboard controller is coupled to the first RF transmitter/receiver and is responsive to the range information indicating the mobile device is out of range to disable key input data of the keyboard. After the key input data is disabled, the controller enables the key input data responsive to the range information indicating the mobile device has come back into range.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
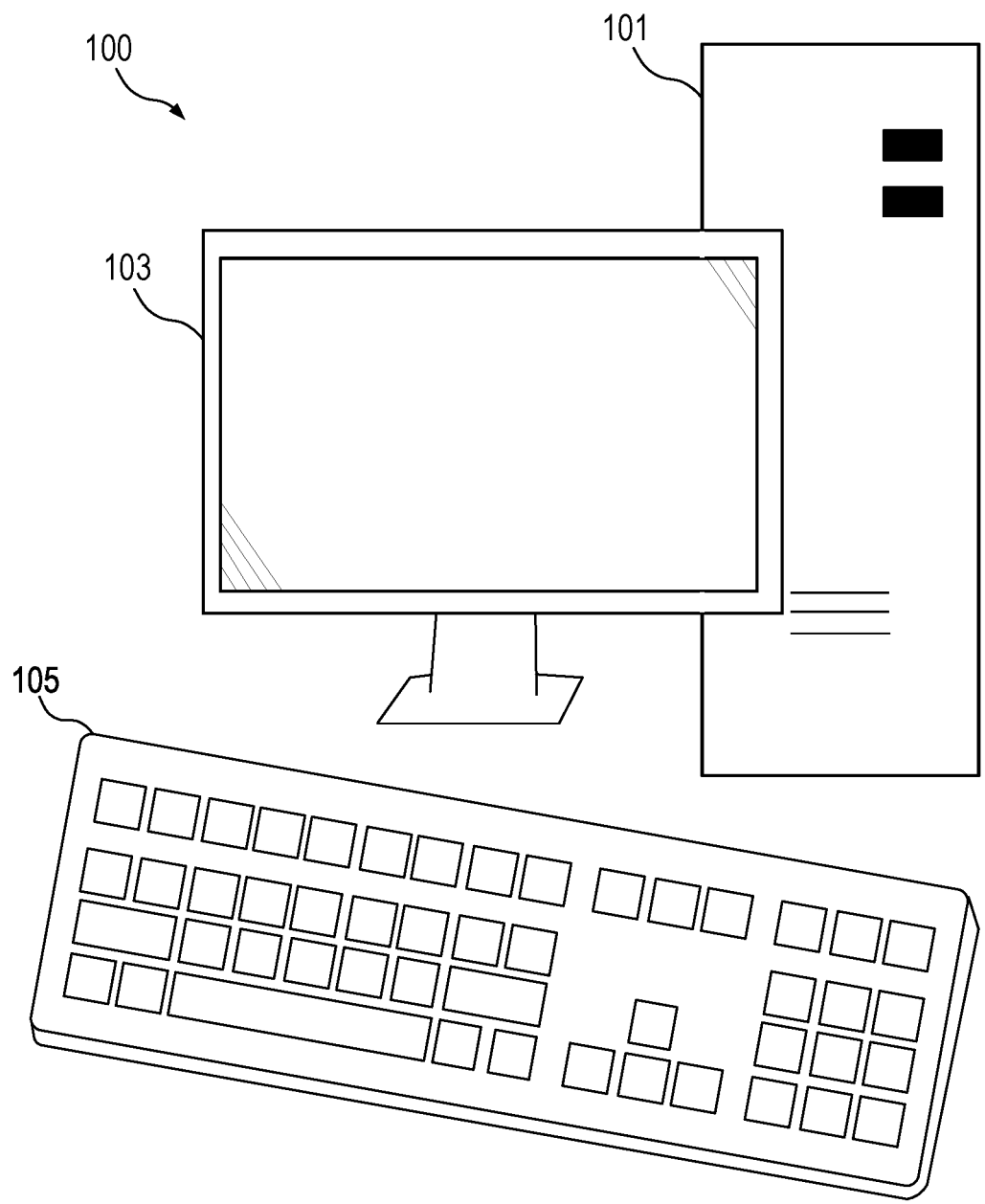
FIG. 1 illustrates an exemplary information handling system configured as a desktop system with a wireless keyboard.
Figure 2:
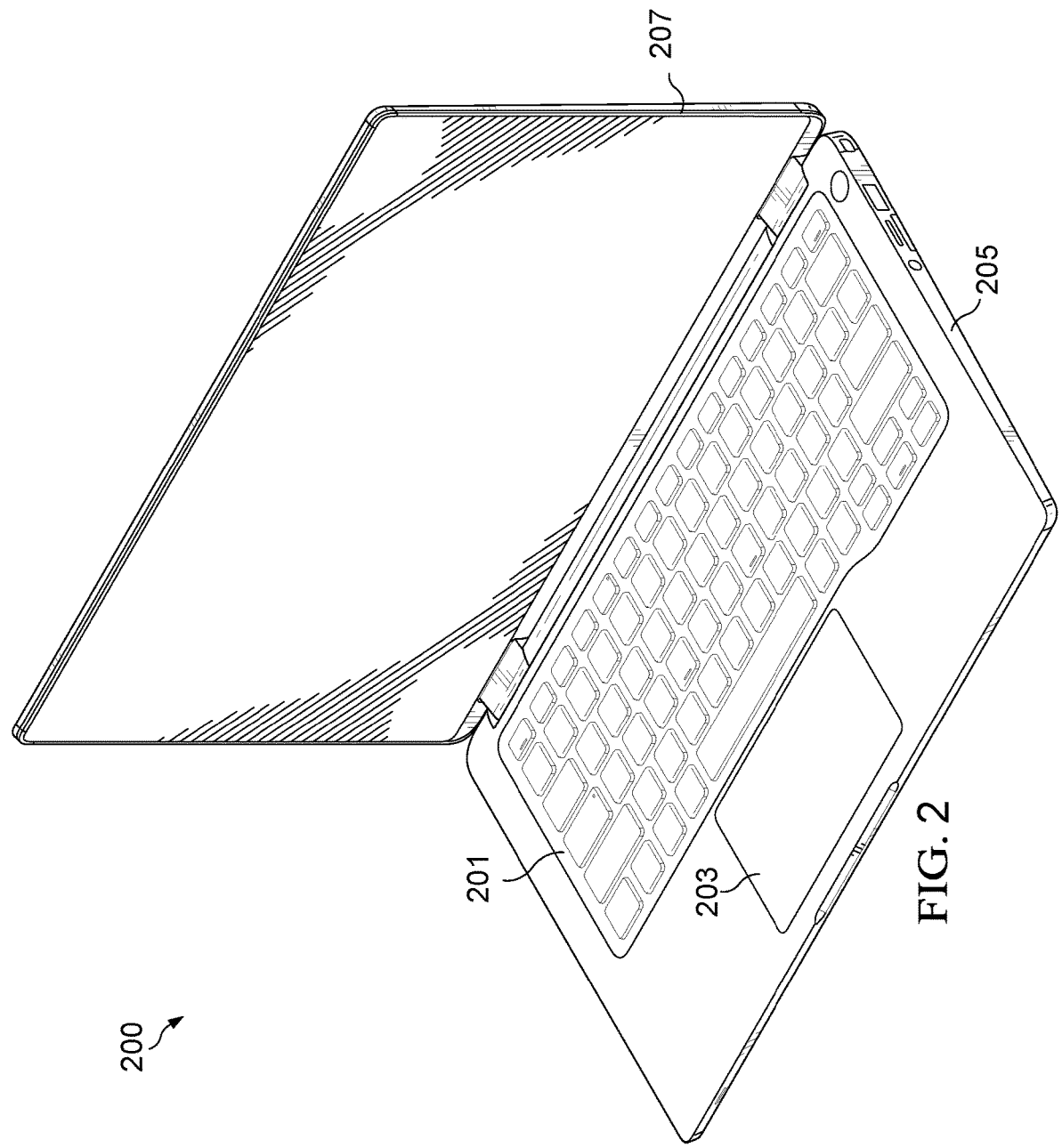
FIG. 2 illustrates an exemplary information handling system configured as a laptop system with an integrated keyboard.

FIG. 1 illustrates an exemplary information handling system 100 in a desktop configuration that includes the desktop housing 101 containing the processors, memory, and related electronics, a monitor 103, and a wireless keyboard 105. FIG. 2 illustrates an exemplary information handling system 200 in a laptop configuration. The laptop includes a keyboard 201, a track pad 203, a housing 205 for the processor(s), memory, and related electronics, and a display 207. Embodiments herein focus on unique security approaches for the keyboards in an information handling system.

Figure 3:
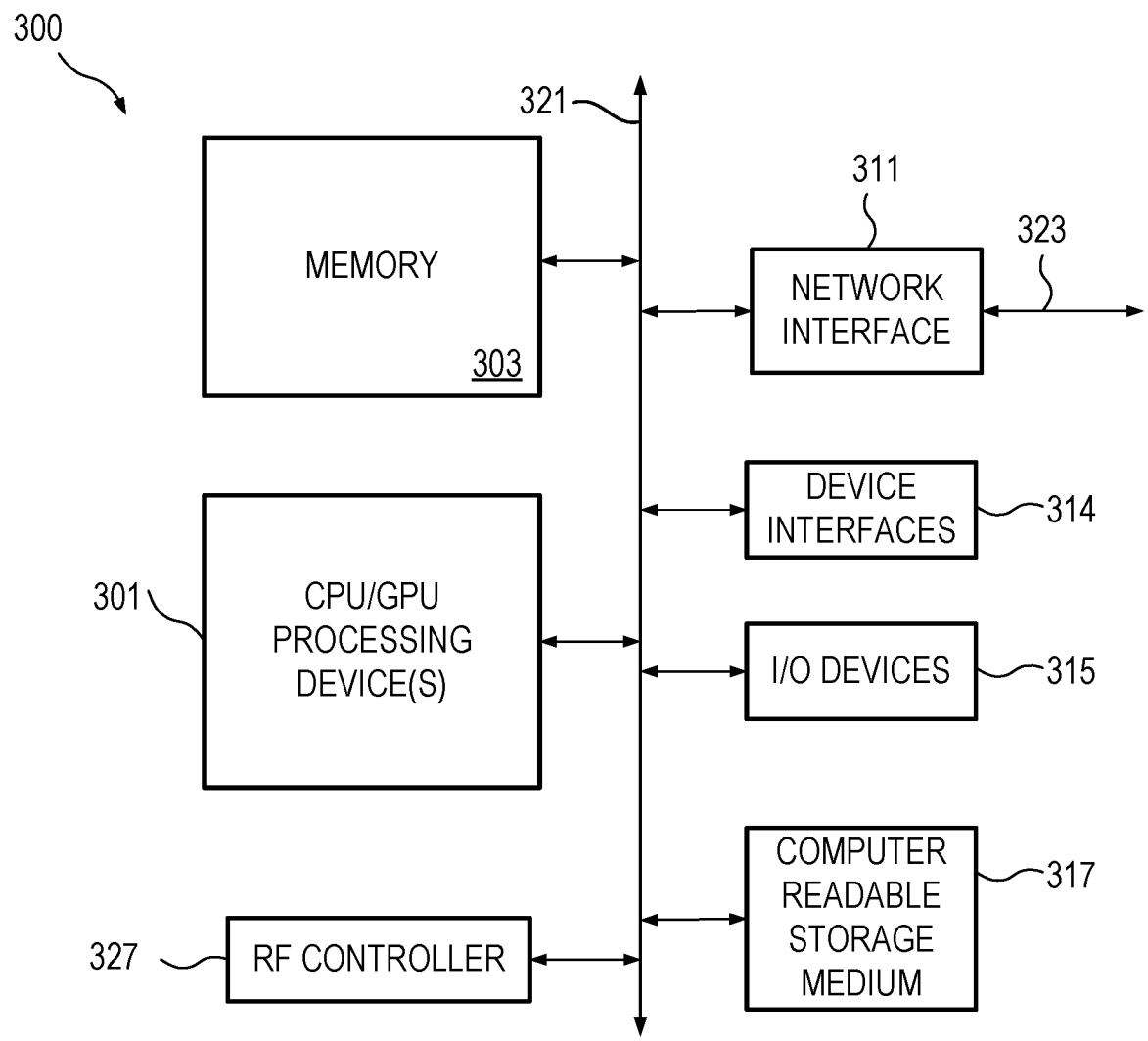
FIG. 3 illustrates a high level block diagram of an information handling system.

FIG. 3 illustrates a high level block diagram of a portion of an information handling system 300. The IHS 300 may be configured in a portable configuration, such as a tablet or convertible form factor, a stationary configuration, such as a desktop or tower form factor, a server configuration or other types of more specialized form factors, such as storage devices. The system 300 includes processing device(s) 301, the processing devices(s) including one or more central processing units (CPUs), and/or one or more graphics processing units (GPUs), each having one or more processing cores, for executing the various types of program instructions stored in memory 303 such as Basic Input/Output System (BIOS), the operating system, and various applications. The computer readable memory 303 may include volatile memory including random access memory and non-volatile memory such as read-only memory (ROM), flash memory, non-volatile random access memory (NVRAM). In embodiments, IHS 300 includes one or more network interface device(s) 311, one or more device interface(s) 314, one or more I/O device(s) 315 and one or more computer readable storage medium(s) 317. Processing device(s) 301, system memory 303, network interface device(s) 311, device interface(s) 314, I/O device(s) 315, and computer readable storage medium(s) 317 are coupled to system interconnect 321 for communicating signals and data between the various system components. System interconnect 321 may represent one or more buses, interfaces, hubs and/or controllers that are used to transfer information between the various system components. Other components not specifically shown in FIG. 3 may also be included within the information handling system 300. System 300 may include additional processing devices such as embedded processors (referred to herein as microcontrollers (MCUs), programmable logic devices (such as a field programmable gate array "FPGA", complex programmable logic device "CPLD", etc.) to support various I/O tasks.

Network interface device(s) (NID) 311 enables IHS 300 to communicate with other devices, systems and/or services via network 323 using one or more communication protocols. Network 323 may be a local area network (LAN), wide area network WAN), personal area network (PAN). Device interface(s) 314 may generally include one or more communication interfaces or ports, which provide physical connection to and enable communication with external devices and cables. Examples of device interface(s) 314 include, but are not limited to, a Universal Serial Bus (USB) interface, a card reader, a Personal Computer Memory Card International Association (PCMCIA) port, and a high-definition multimedia interface (HDMI). Input/Output (I/O) device(s) 315 may include any input device and/or output device provided on, within or coupled to an IHS. Examples of input devices include, but are not limited to, a keyboard, mouse, touch screen, touch pad, microphone, and a camera. Examples of output devices include, but are not limited to, a computer monitor, a display device, printer, or audio speaker(s).

Computer readable storage medium 317 is generally configured to store user data and applications. The applications stored within computer readable storage medium 317 may contain program instructions (or computer program code), which may be executed by processing device(s) 301 to perform various tasks and functions for the information handling system and/or for the user. According to one embodiment, computer readable storage medium 317 may comprise one or more hard disk drives (HDDs) or solid-state drives (SSDs). Shown separately from the other interfaces is a radio frequency (RF) controller 327 that provides RF communication capabilities such as Bluetooth™, Wi-Fi™, and/or other short or long range RF communication. The RF controller allows the IHS to communicate wirelessly with devices including printers, keyboards, wireless routers, etc. The RF controller may support more than one RF protocol or may include separate RF controllers to support multiple RF protocols. The RF controller 327 includes at least on RF transmitter/receiver.

Figure 4:
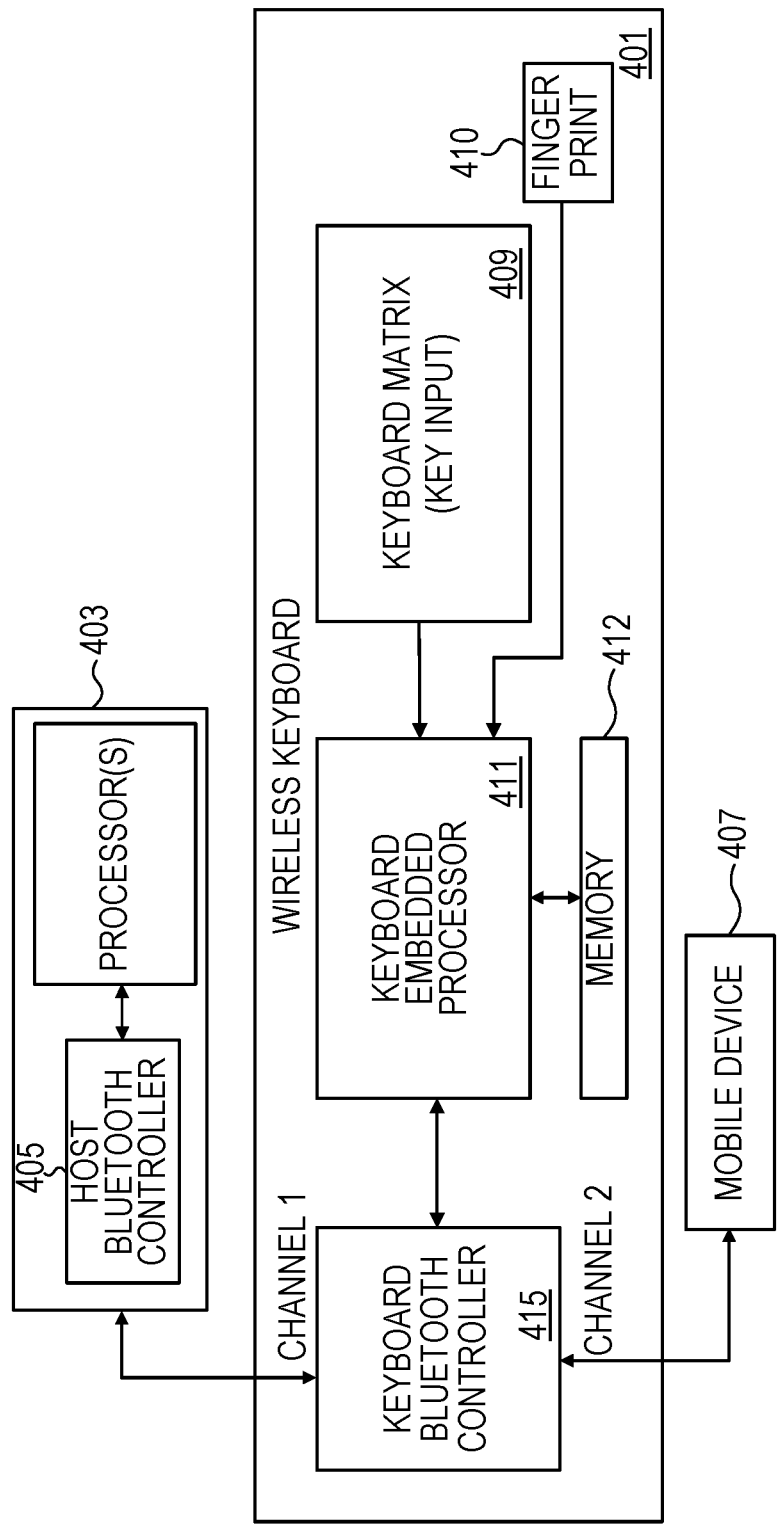
FIG. 4 illustrates a high level block diagram of a wireless keyboard according to an embodiment along with a mobile device and a host system coupled to the keyboard.

In order to provide additional security, embodiments herein disable key input data of a keyboard when a paired mobile device of a user moves out of range of the keyboard. FIG. 4 illustrates a high level block diagram of a keyboard 401. In embodiments, keyboard 401 is an embodiment of the wireless keyboard 105 such as shown in FIG. 1. FIG. 4 also shows a host system 403 that includes a host Bluetooth controller 405. In embodiments, the host system 403 is an embodiment of the IHS 300 (see FIG. 3) where the Bluetooth controller is an embodiment of the RF controller 327 shown in FIG. 3. FIG. 4 shows a mobile device 407, which may any device with RF capability (such as Bluetooth) typically carried or worn by a user that is paired via Bluetooth (or other wireless protocol) with the keyboard 401. For example, the mobile device may a mobile phone, a watch, headphones, an identification card worn by a user containing Bluetooth capability, or any other wearable or carried device.

The keyboard 401 includes a keyboard matrix 409 on which a user inputs key data. The keyboard matrix 409 supplies the key data to the keyboard MCU 411. The keyboard MCU 411 functions as the keyboard controller in the illustrated embodiment. Embodiments utilize other control logic in addition to or in place of the MCU 411. The keyboard MCU supplies the keyboard Bluetooth (or other RF protocol) controller 415 with the key input data. The Bluetooth (or other RF protocol) controller 415 includes an RF transmitter/receiver to provide communication capability. The MCU 411 programmed with control software provides control functionality for the keyboard 411, including the functionality to enable and disable the key input data. Memory 412 stores control software and data such as key sequences and fingerprint data for use in overriding a disabled keyboard condition described further herein. The RF transmitter/receiver of the keyboard Bluetooth controller 415 communicates with the RF transmitter/receiver of the host Bluetooth controller 405 to supply the host system 403 with the key data through a first Bluetooth channel shown as channel 1. The particular RF channel that is used varies in different embodiments. The keyboard Bluetooth controller 415 communicates with the mobile device over a second Bluetooth channel shown as channel 2. The particular RF channel that is used for the second Bluetooth channel varies in different embodiments. The keyboard 401 is capable of being paired with at least two devices.

Figure 5:
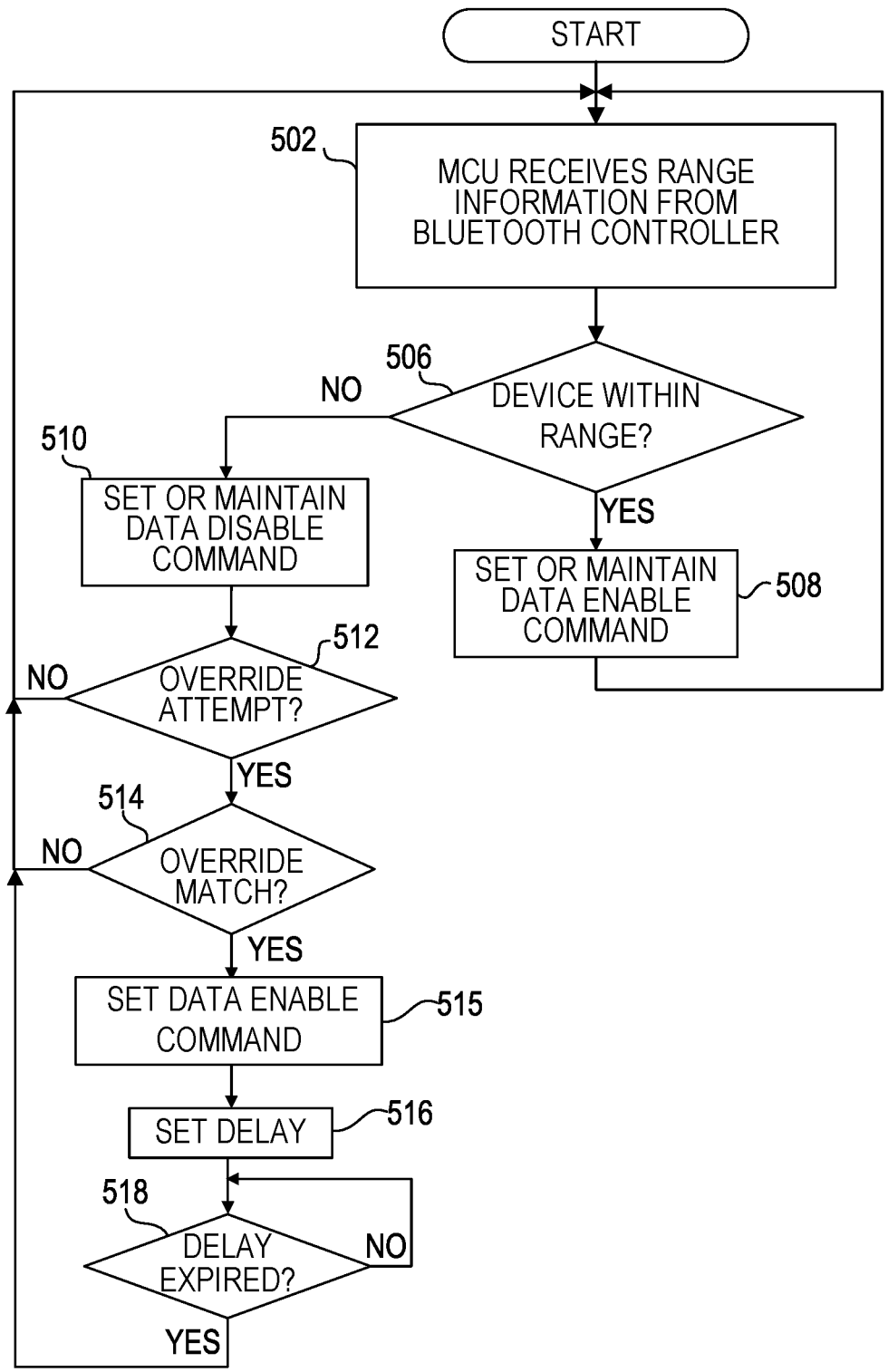
FIG. 5 illustrates a flow diagram for operation of the wireless keyboard.

FIG. 5 illustrates a flow chart illustrating the control flow for securely enabling or disabling key input data of the wireless keyboard 401. The keyboard Bluetooth controller 415 is paired both with the mobile device on one Bluetooth channel and with the host Bluetooth controller 405 on another Bluetooth channel prior to the flow illustrated in FIG. 5. Note that pairing of Bluetooth devices is well known in the art so will not be further discussed herein. With reference to both FIGS. 4 and 5, the keyboard Bluetooth controller 415 (shown in FIG. 4) is configured, e.g., by MCU 411, to monitor the range of the mobile device 407 to determine if the mobile device is in range or out of range. As an example, the mobile device is considered out of range when it is farther than 10 meters from the keyboard. The Bluetooth controller 415 provides range information to the MCU 411. In an embodiment the Bluetooth controller 415 monitors the range of the mobile device based on the received signal strength indicator (RSSI), which indicates the signal strength of the signal from the mobile device. If the RSSI is below an out of range threshold, the mobile device is out of range and if the mobile device signal is above an in range threshold, the mobile device is considered to be in range.

In embodiments, the keyboard Bluetooth controller 415 provides range information to the MCU in response to MCU periodic requests for the range information or periodically without the MCU needing to request the range information. The range information may be RSSI values or simply a range indication (in range or out of range) based on the RSSI values. In other embodiments, the Bluetooth controller communicates a change in the range information to the keyboard MCU 411 when the RSSI value drops below a predetermined out of range threshold value indicating the device is out of range and when the mobile device becomes in range when the RSSI exceeds a predetermined in-range threshold value. In embodiments the out-of-range threshold and the in-range threshold differ to provide hysteresis. In embodiments the MCU receives the RSSI information and determines whether the mobile device is in range and out of range based on comparisons to in range and out of range thresholds stored in memory 412. Other embodiments use different RF protocols and different approaches to determine whether the mobile device is in range or out of range. For example, some RF protocols provide distance measurement capability using phase information and that information is communicated to the keyboard embedded controller 411 in such embodiments. One or more embodiments utilize get/set commands to establish presence information of the mobile device and enable/disable key input data in the keyboard. A get command causes the Bluetooth controller to check the presence status (in range or out of range) of the paired mobile device and communicates that presence information to the MCU 411. Set commands to the MCU 411 allow key input data to be enabled or disabled. If the mobile is not in range, a set command causes the MCU to block key input data. If in range, a set command in the MCU allows key input data. If an override occurs using, e.g., a key combination, a set command in the MCU again allows key input data.

With reference to FIG. 5, in 502 the keyboard MCU 411 receives range information (either as a result of a change in range status, periodic range information, or by request) from the keyboard Bluetooth controller. In 506, the keyboard MCU 411 determines if the range information indicates the mobile device 407 is in range or out of range. If the device has changed from being out of range to being in range, the MCU 411 sets the data enable command in 508 to enable the key input data. In an embodiment enabling the key input data allows the key input data entered on keyboard matrix 409 to be sent from the MCU to the keyboard Bluetooth controller 415 and therefore from the keyboard Bluetooth controller 415 to the host Bluetooth controller 405. The flow then returns to 502 for the MCU to receive the next range information. Also in 508, if the range information indicates that the mobile device remains in range as opposed to becoming in range from out of range, the key input data remains enabled.

If in 506, the range information indicates the device is out of range (or remains out of range) the MCU 411 sets the data disable command in 510 which causes the MCU to stop sending key input data to the keyboard Bluetooth controller 415 and thereby disables the key input data. Since no data is received by the keyboard Bluetooth controller 415, no data is sent and the keyboard is effectively disabled. If the key input data is already disabled, the data disable status is maintained. Once the key input data has been disabled (or the data disabled state is maintained) in 510 the flow goes to a check to see if an override has been received. The override function provides for circumstances where the mobile device has been lost, loses power, breaks, or otherwise become unavailable. The override may be a key sequence previously set up to enable key data, e.g., R+Y+F+H, or any other appropriate key combination deemed suitable from a security standpoint. In embodiments the key sequence is stored in memory 412. Alternatively, or in addition, the override function may use fingerprint reader 410. The fingerprint data for comparison to an override fingerprint is stored in memory 412. If no override attempt is made (key input or fingerprint), the flow returns to 502 to receive the next range information. In 514 the MCU checks for a match, either a key sequence match or a fingerprint match. If the override attempt results in a match, the MCU 411 sets the data enable command in 515 and the keyboard MCU once again allows key input data to be sent to the Bluetooth controller and therefore to the host Bluetooth controller. In addition, in 516, the MCU 411 sets a delay interval used to ensure that the system does not immediately disable the keyboard again if the mobile device is still out of range requiring the user to continually attempt to override the locked keyboard. If the override attempt does not result in a match in 514, the flow returns to wait to receive the next range information in 502. The delay may be minutes or hours and in embodiments is configurable. Assume as an example that the delay defaults or is set to one hour. After the hour expires in 518 the flow returns to 502 for the processor to receive new range information. Note that if the range information is only received in response to a change, the flow returns to 506 to check if the device is in range or out of range in 506 based on the last received range information. Note that if necessary, depending on how often range information is provided, in embodiments the override attempt check is interrupt driven triggered by a fingerprint check or key sequence while key data is disabled. In addition, the check in 506 may be interrupt driven when new range information is available.

Figure 6:
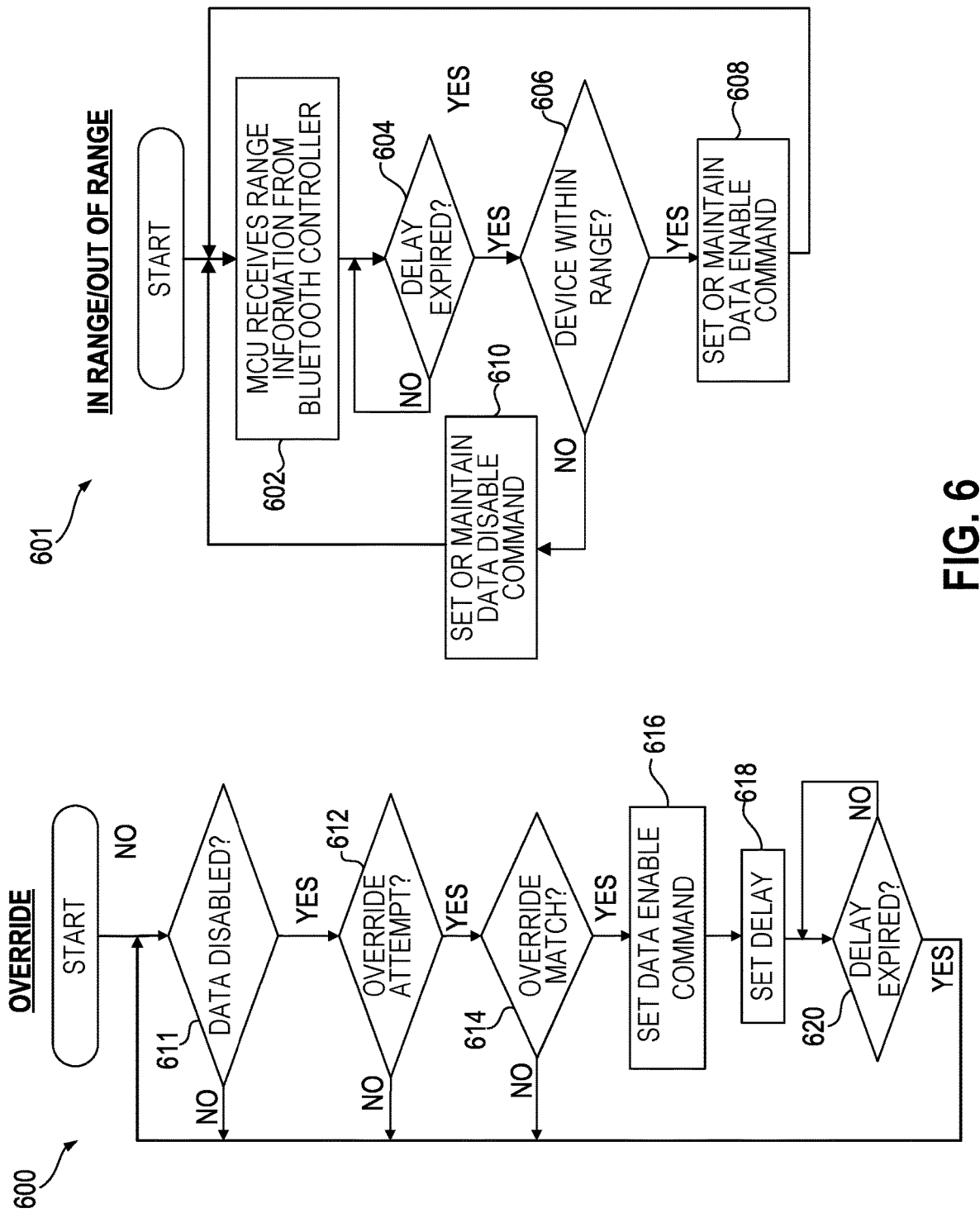
FIG. 6 illustrates a flow diagram for operation of another embodiment of the wireless keyboard.

FIG. 6 shows a flow diagram for operation of another embodiment of the wireless keyboard in which the override and in range/out of range flows operate as independent threads 600 and 601. While the flows are similar to that of FIG. 5, there are a few differences. With reference to FIG. 6, for in range/out of range thread 601 the keyboard MCU 411 receives range information (either as a result of a change in range status, periodic range information, or by request) in 602 from the keyboard Bluetooth controller. In 604 the MCU 411 determines if a delay from an override is still in force. If so, the MCU waits until the delay has completed. The keyboard MCU 411 determines if the range information indicates the mobile device 606 is in range or out of range. If the device is in range, the MCU 411 sets (or maintains) the data enable command in 608 to enable the key input data. The flow then returns to 602 for the MCU to receive the next range information. If in 606, the range information indicates the device is out of range (or remains out of range) the MCU 411 sets or maintains the data disable command in 610, which causes the MCU to stop sending key input data to the keyboard Bluetooth controller 415 and thereby disables the key input data.

For override thread 600, the MCU checks in 611 if a data disable command has disabled key input data. If a data disable command has been set, and no override attempt is made (key input or fingerprint) in 612, the flow returns to 611 to see if data remains disabled. If an override attempt is made in 612, in 614 the MCU checks for a match, either a key sequence match or a fingerprint match. The override function is as described in associated with FIG. 5. If the override attempt results in a match, the MCU 411 sets the data enable command in 616. The keyboard MCU once again allows key input data to be sent to the Bluetooth controller and therefore to the host Bluetooth controller. In addition, in 618, the MCU 411 sets a delay interval (if desired) used to ensure that the system does not immediately disable the keyboard again if the mobile device is still out of range requiring the user to continually attempt to override the locked keyboard. Once the delay expires in 620 the flow returns to see if data is disabled in 611. If the override attempt does not result in a match in 614, the flow returns to 611 to check if data remains disabled.

Figure 7:
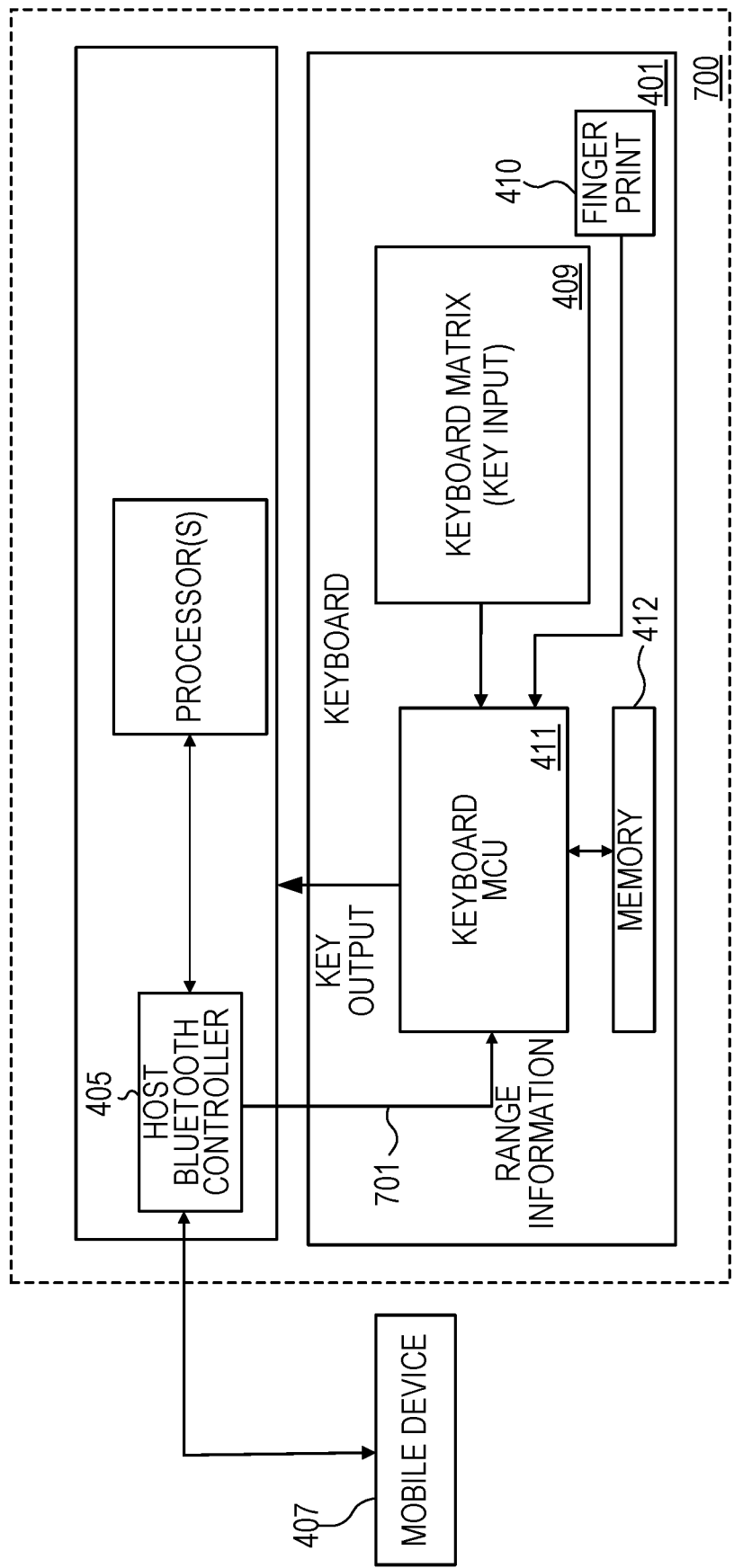
FIG. 7 illustrates a high level block diagram of an embodiment for enhanced keyboard security implemented in an information handling system in a laptop configuration.

While FIG. 4 describes an IHS with a wireless keyboard, FIG. 7 illustrates an laptop embodiment 700 that enables enables/disables key input data based on range of the mobile device 407. With reference to FIG. 7, the MCU 411 communicates directly with the host Bluetooth controller 405 via a wired connection 701 and the host Bluetooth controller 405 is configured to detect the range of the mobile device and provide that information to the keyboard MCU 411 to allow the keyboard MCU to enable/disable key input data. In addition, the override works the same as illustrated in FIGS. 4 and 5. Note that the Bluetooth controller 405 may communicate with other control logic in system 700, which in turn instructs the keyboard MCU to enable/disable key input data.

In order to set up an IHS with enhanced keyboard security, software operating on the IHS allows a user to pair an appropriate device (mobile phone, watch, ID badge, etc.), allows for a desired key override sequence and/or to enter an override fingerprint. In one or more embodiments the initial setup requires at least some administrator privileges to ensure appropriate security is maintained. In embodiments, the user can specify a time that the override is effective. The keyboard is paired with two devices (host system and mobile device) thereby preventing the keyboard from being easily replaced without going through a complete keyboard setup. That setup can require appropriate security measures to ensure that any keyboard replacement is authorized.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected directly or indirectly.

Thus, various aspects have been described related to a keyboard that disables key input when a paired mobile device is not in range. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. An information handling system comprising:
   a keyboard including a keyboard controller;
   a first radio frequency (RF) transmitter/receiver in the keyboard to determine range information for a mobile device paired with the first RF transmitter/receiver and to provide the range information to the keyboard controller;
   wherein the keyboard controller is configured to disable key input data for the keyboard responsive to the range information indicating that the mobile device is out of range;
   a second RF transmitter/receiver;
   wherein the first RF transmitter/receiver communicates the key input data to the second RF transmitter/receiver over a first RF channel when the key input data of the keyboard is not disabled; and
   wherein the first RF transmitter/receiver communicates with the mobile device over a second RF channel.

2. The information handling system as recited in claim 1 wherein the keyboard further comprises a microcontroller unit and the microcontroller unit is responsive to the mobile device being out of range to disable the key input data.

3. The information handling system as recited in claim 1 wherein after the key input data is disabled the key input data is enabled responsive to a key sequence entered on the keyboard matching a predetermined key sequence.

4. The information handling system as recited in claim 1 wherein the information handling system further comprises a fingerprint reader and after the key input data is disabled the key input data is enabled responsive to a fingerprint being read and determined to be valid.

5. The information handling system as recited in claim 1 wherein after the key input data is disabled the key input data is enabled responsive to the mobile device coming back into range.

6. A method for an information handling system comprising:
   determining if a mobile device paired with the information handling system is out of range;
   disabling key input data for a keyboard of the information handling system responsive to the mobile device being out of range;
   communicating the key input data from a first RF transmitter/receiver in the keyboard to a second RF transmitter/receiver in the information handling system using a first RF channel while the key input data is not disabled; and
   using the first RF transmitter/receiver to communicate with the mobile device over a second RF channel.

7. The method as recited in claim 6 further comprising enabling the key input data responsive to a key sequence being entered on the keyboard matching a predetermined key sequence.

8. The method as recited in claim 6 further comprising enabling the key input data responsive to a fingerprint being read.

9. The method as recited in claim 6 further comprising enabling the key input data responsive to the mobile device coming back into range.

10. A keyboard of an information handling system comprising:
    a first radio frequency (RF) transmitter/receiver to provide range information for a mobile device paired with the first RF transmitter/receiver;
    a keyboard controller coupled to the first RF transmitter/receiver and responsive to the range information indicating the mobile device is out of range to disable key input data of the keyboard;

wherein after the key input data is disabled the keyboard controller enables the key input data responsive to the range information indicating the mobile device has come back into range; and wherein the first RF transmitter/receiver communicates with a second RF transmitter/receiver in the information handling system over a first RF channel and communicates with the mobile device over a second RF channel.

11. The keyboard as recited in claim 10 wherein the keyboard controller is responsive to an override to enable the key input data.

12. The keyboard as recited in claim 10 wherein the keyboard communicates the key input data over the first RF channel to the second RF transmitter/receiver.

13. The keyboard as recited in claim 11 wherein the override is a predetermined key sequence or a fingerprint being read that matches a stored fingerprint.

14. The keyboard as recited in claim 11 wherein a delay interval is used after the override to ensure the keyboard is not disabled again during the delay interval due to the mobile device being out of range.

15. The keyboard as recited in claim 14 wherein the delay interval is programmable.

16. The information handling system as recited in claim 1, wherein the key input data is enabled responsive to an override; and wherein a delay interval is used after the override to ensure the keyboard is not disabled again during the delay interval due to the mobile device being out of range.

17. The method as recited in claim 6 further comprising:
enabling the key input data responsive to an override; and
using a delay interval after the override to ensure the keyboard is not disabled again during the delay interval due to the mobile device being out of range.

* * * * *